250/201

United States Patent [19]

Fearnside

[11] 4,264,809
[45] Apr. 28, 1981

[54] SERVO CONTROL LOOP USING OPTICAL FEEDBACK

[75] Inventor: William T. Fearnside, Fishers, N.Y.

[73] Assignee: Eastman Kodak Company, Rochester, N.Y.

[21] Appl. No.: 35,160

[22] Filed: May 2, 1979

[51] Int. Cl.³ .................................................. G01J 1/20
[52] U.S. Cl. ...................................... 250/201; 250/235
[58] Field of Search ............... 250/201, 234, 235, 236, 250/237 G, 216, 230; 358/206, 208; 350/6.6

[56] References Cited

U.S. PATENT DOCUMENTS

| 4,091,274 | 5/1978 | Angelbeck et al. | 250/201 |
| 4,097,875 | 6/1978 | Scholten et al. | 250/237 G |
| 4,127,781 | 11/1978 | Sato | 250/230 |
| 4,130,838 | 12/1978 | St. John | 358/206 |
| 4,178,064 | 12/1979 | Mrdjen | 250/235 |

*Primary Examiner*—David C. Nelms
*Attorney, Agent, or Firm*—Donald W. Strickland

[57] ABSTRACT

In accordance with a presently preferred embodiment of the invention, a servo control loop is disclosed using optical feedback to control the movement of a small, lightweight scanning mirror. The optical feedback is accomplished by reflecting radiation from the scanning mirror and imaging such radiation onto a pair of radiation detectors. An optical element having alternate relatively transparent and opaque regions is disposed in the optical path between the scanning mirror and the detectors to modulate in phase quadrature the intensity of radiation beams received by the detectors. The output signals from the detectors are used to develop a feedback signal to close the servo loop.

4 Claims, 25 Drawing Figures

SERVO CONTROL LOOP USING OPTICAL FEEDBACK

BACKGROUND OF THE INVENTION

1. Field of the Invention

The present invention relates to a servo control loop and, more particularly, to a servo control loop having optical feedback.

2. Description Relative to the Prior Art

An essential element in a variety of information processing systems of the type that includes optical scanning and/or tracking apparatus is a controllably positionable light beam deflecting mirror. In high speed scanning or tracking systems, the beam deflecting mirror must be capable of rapidly and accurately directing an incident light beam to a desired location. Various mirror type deflectors are known in the art. One type of deflecting mirror is electromagnetically driven and is commonly referred to as a galvanometer scanner. Systems of this type are capable of high performance but are expensive, complex, and can present hysteresis problems (see E. P. Grenda et al., "Closing the Loop on Galvo Scanners", Electro Optical Design, pp. 32-34, April, 1974). Another type of mirror deflector utilizes a mirror directly attached to a piezoelectric shear transducer that acts as a driver. The transducer driver is often referred to as a "bimorph" or a "bimorph bender". (See: J. J. Shaffer, et al., "Bender-Bimorph Scanner Analysis", Applied Optics, pp. 933-37, April, 1970; U.S. Pat. No. 3,544,201; U.S. Pat. No. 3,794,410; and U.S. Pat. No. 1,438,974). Bimorph scanners can give high performance, are simple in construction and low in cost. Because of these desirable characteristics, bimorph scanners have achieved general acceptance in the art. One disadvantage of a bimorph scanner of the type described above is that it is only capable of a very small deflection and tilt angle: 0.004 inches deflection and $\frac{1}{8}°$ tilt angle are approximate numbers for a one-inch long bimorph bender. To increase mirror deflection and tilt angle, U.S. Pat. No. 3,981,566 discloses the use of a mechanical linkage coupling the bimorph bender to the deflection mirror that increases the range of motion of the mirror.

It is desirable to use a servo system to obtain precise control of the parameters of the deflection mirror i.e., position and velocity. In such a servo system a feedback signal indicative of the position or velocity of the deflecting mirror is derived. This feedback signal is compared with a reference signal indicative of the desired mirror position/velocity. A difference between the feedback signal and the reference signal produces an error signal indicating that the mirror is not operating as desired. The error signal, after amplification, is used to correct the mirror scan parameters. A problem in using such a servo system with a high-speed scanning system, however, is the difficulty in obtaining the feedback signal. For those applications where high-speed scanning is desired (e.g., in computer and video applications) the deflection mirror and any associated mechanical linkage is made quite small to reduce the effects of inertia. Because the scanning mirror and associated moving parts are extremely light, mechanical sensing of the mirror movement would "load" the system and thereby lower its fundamental resonant frequency. Lowering the fundamental resonant frequency of a mechanical scanner is tantamount to reducing the bandwidth of the scanner since little angular movement can be obtained in a mechanical scanner beyond its fundamental resonant frequency (since the response drops off at about 40 db/decade). Bandwidth reduction due to mechanical loading of small, lightweight scanning mirrors can be quite severe, easily reaching an order of magnitude or more.

U.S. Pat. No. 4,044,248 discloses apparatus for correcting the velocity of a scanning mirror wherein the feedback signal is obtained through an optical coupling technique. A light beam is directed onto the scanning mirror and imaged, upon passing through an optical grating, onto a photocell. The grating modulates the light beam passing therethrough so the photocell output signal has a frequency proportional to the velocity of mirror scan. From this output signal a feedback signal is derived that compensates for velocity errors of the scanning mirror. While this technique eliminates inertial loading of the scanning mirror, it provides only velocity correction of the scanning mirror. It is desirable for certain applications to be able to determine the direction of mirror scan and to maintain absolute mirror position throughout the scan.

SUMMARY OF THE INVENTION

The present invention provides apparatus for obtaining a signal indicative of the actual position of a deflection mirror, or other moving device, and its direction of movement. Moreover, even though the deflection mirror (or other device) may be small, lightweight and delicate, no additional mechanical loading is introduced. In accordance with one embodiment of the present invention, means are provided for forming a radiation pattern on the deflection mirror. An optical lens focusses a reflected image of the radiation pattern onto a pair of radiation detectors. An optical element comprised, in alternation, of relatively transparent and opaque regions is so disposed in the optical path between the deflection mirror and the radiation detectors that the intensity of radiation received by the detectors is modulated in phase quadrature. The output signals from the detectors are so processed that a signal is obtained indicative of the actual mirror position and direction of mirror movement. In a further aspect of the invention, the output signals from the detectors are used to develop a feedback signal for a servo control loop that maintains absolute mirror position throughout the scan. Importantly, because no inertia was added to the scanning system in obtaining the feedback signal, there is no reduction in the bandwidth of the scanning system.

BRIEF DESCRIPTION OF THE DRAWINGS

In the detailed description of the preferred embodiments of the invention presented below, reference is made to the accompanying drawings, in which:

FIGS. 6, 7a-7r and 8 are circuit diagrams, and certain signal waveforms associated therewith, useful in describing the operation of the servo control loop of FIG. 3.

DETAILED DESCRIPTION OF THE PREFERRED EMBODIMENTS

Figure 1:
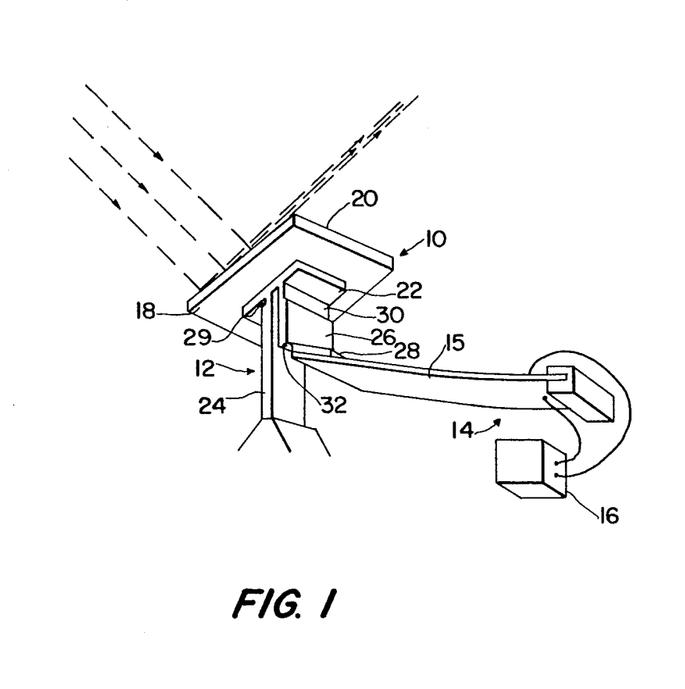
FIG. 1 shows a known type of scanning element.

For purposes of illustration, the present invention will be described in connection with a bimorph mirror scanner of the type disclosed in U.S. Pat. No. 3,981,566. It will be apparent to those of ordinary skill in the art, however, that the present invention is not so limited but, rather, has general application whenever it is desired to sense the position of a moving mirror, or a moving device having a reflective surface or a mirror attached thereto. FIG. 1 depicts a bimorph scanning mirror having mechanical linkage coupling. The scanning element comprises a deflection mirror 10 and a mounting assembly 12 coupled to drive means 14 comprised of a bimorph driver 15 and a controllable electrical driver 16 that causes deflection of the bimorph driver. The mirror 10 has a rear face 18 and a reflecting front face 20 for redirecting light rays (represented as dashed lines). At the rear face 18, the mirror 10 is attached to a platform 22 that forms part of the mounting assembly 12. The mounting assembly 12 additionally includes a support post 24, a drive link 26, and a connecting tab 28. A fulcrum for rotation of the mirror 10 is provided by a hinge 29 connecting the support post 24 to platform 22. Deflection forces causing rotation of the mirror 10 about the fulcrum provided by the hinge 29 are transmitted through the drive link 26 to the platform 22 via a hinge 30 having a hinge axis parallel to that of the hinge 29. Such deflection forces are received from the connecting tab 28 that is attached to move with the bimorph driver 15 and is coupled to the drive link 26 by a hinge 32. In terms of physical size, the scanning element (comprised of deflection mirror 10 and the mounting assembly 12) is quite small and delicate, generally being no larger than a "pea".

The bandwidth handling capability of the scanning element shown in FIG. 1 is limited by the fundamental resonant frequency of its mechanical structure. By keeping all components small and lightweight, such scanning elements can be designed having resonant frequencies on the order of a few kilohertz. A typical gain vs. frequency response curve is qualitatively shown in FIG. 2. The fundamental resonant frequency occurs at about 900 Hz, with a secondary peak at about 1100 Hz. The gain drops off sharply (apart from the secondary peak at 1100 Hz) at frequencies above the fundamental resonant frequency. Any attempt to mechanically sense the mirror 10 position during a scanning operation would load the mechanical structure and lower the fundamental resonant frequency. In view of the extremely small and lightweight components that make up the scanning element, mechanical loading can easily lower the fundamental resonant frequency by an order of magnitude or more. In the case of the scanning element represented by the graph of FIG. 2, such a reduction in resonant frequency would decrease the bandwidth from about 1,000 Hz to just 100 Hz, thereby making the scanning system useless except for low-speed scanning applications.

In accordance with one embodiment of the present invention, a servo control loop is provided for use in maintaining accurate position, and thus movement, control of a scanning mirror of the type shown in FIG. 1. Rather than attempt to monitor the position of the mirror by mechanical means, the scanning mirror is optically coupled to the feedback loop. Since optical coupling does not mechanically load the scanning element, the fundamental resonant frequency of the element—and thus the system bandwidth—remains unchanged.

Figure 3:
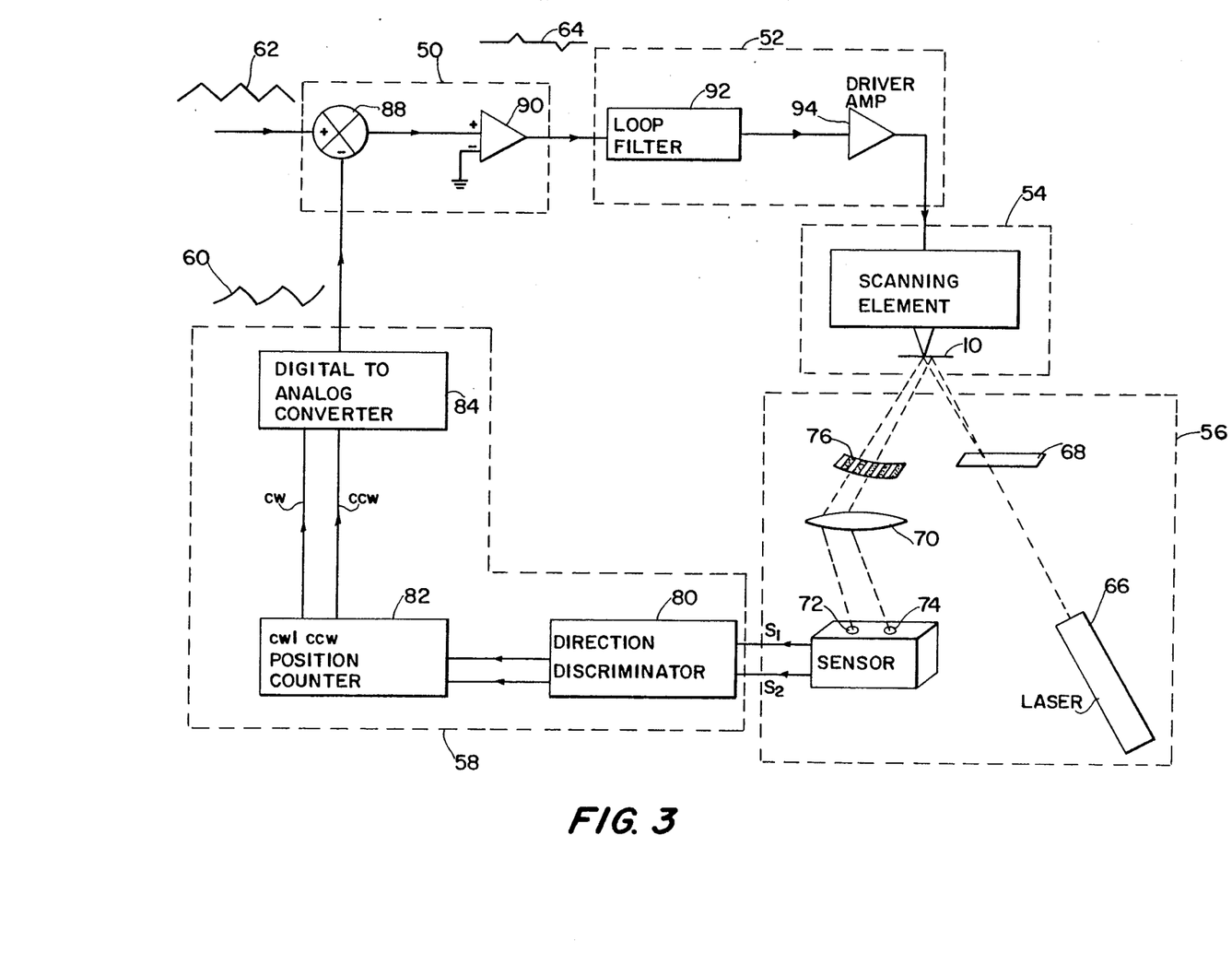
FIG. 3 is a servo control loop incorporating the present invention.

Referring to FIG. 3, a servo control loop is shown embodying the present invention. The servo loop generally comprises an error detector 50, a compensation network 52, a scanning element 54, an optical coupling system 56, and feedback electronics 58. By way of overview, the optical coupling system 56 and the feedback electronics 58 constitute a feedback loop that provides a feedback signal 60 to the error detector 50. Based upon a comparison of the feedback signal 60 with a reference signal 62, the error detector 50 produces an error signal 64 that drives the scanning element 54. The compensation network 52 allows the closed loop gain of the servo loop to be made relatively flat over the operating bandwidth.

The optical coupling system 56 comprises a laser 66 disposed such that its beam strikes a lenticular film 68 (e.g., a diffraction grating) and is split into several beams of which two strike a portion of the surface of the scanning mirror 10. The two beams are reflected from the scanning mirror 10 and focussed by an optical lens 70 onto respective radiation detectors 72, 74. The lens 70 is positioned such that the axis of rotation of the scanning mirror 10 and the surfaces of detectors 72, 74 are at conjugate distances for the lens 70. (In effect, the lens is positioned to image the axis of rotation of the scanning mirror 10 onto the plane of detectors 72, 74.) This positioning of the lens 70 ensures that the spots of radiation on the mirror 10 will be imaged onto the photodetectors 72, 74 irrespective of its angular position if the axis of rotation lies on the reflective surface and if the spots are aligned along the axis of rotation. For other arrangements, e.g., where the axis of rotation is out of the reflective plane of the mirror 10, or where the spots do not fall on the axis of rotation (the case shown in FIG. 3), the spot images on the detectors 72, 74 will wobble as the mirror performs its scanning function. If the wobble is slight, the detector 72, 74 image areas can be made large enough so that the imaged spots are always received by the respective detectors 72, 74. In addition, the conjugate distances of the lens 70 can be adjusted to minimize spot wobble.

An optical element 76 comprised, in alternation, of relatively transparent and opaque regions (shown as evenly spaced clear and opaque line areas in FIG. 3) is, in this embodiment, disposed in the optical path between the scanning mirror 10 and the radiation detectors 72, 74. The transparent/opaque line areas run parallel to the axis of mirror 10 rotation. The relatively transparent and opaque regions do not have to be sharply defined. For example, the optical element 76 can have a sine wave density variation. Sharp transitions between the relatively transparent and opaque regions, however, enable the feedback electronics 58 to be simplified, as discussed in detail with reference to FIG. 6. The element 76 has a cylindrical curvature, the radius of which is about the mirror 10 axis of rotation. In this way, equal numbers of line regions are traversed per degree of mirror rotation regardless of absolute mirror position. The optical element 76 is spaced from the deflection mirror 10 by a distance such that, after reflection from the scanning mirror 10, the two beams strike the element 76 so that when one beam is centered on a transparent area, the other beam is at the edge, or transition, between a (any) clear and opaque area. By this arrangement, the element 76 modulates the two beams in phase quadrature as they move across the optical element 76 in response to mirror 10 deflection. The output signals $S_1$ and $S_2$ of the detectors 72 and 74 will, therefore, also be in phase quadrature, the relative densities of the "transparent" and "opaque" areas determining the depth of modulation of the signals.

Figure 4:
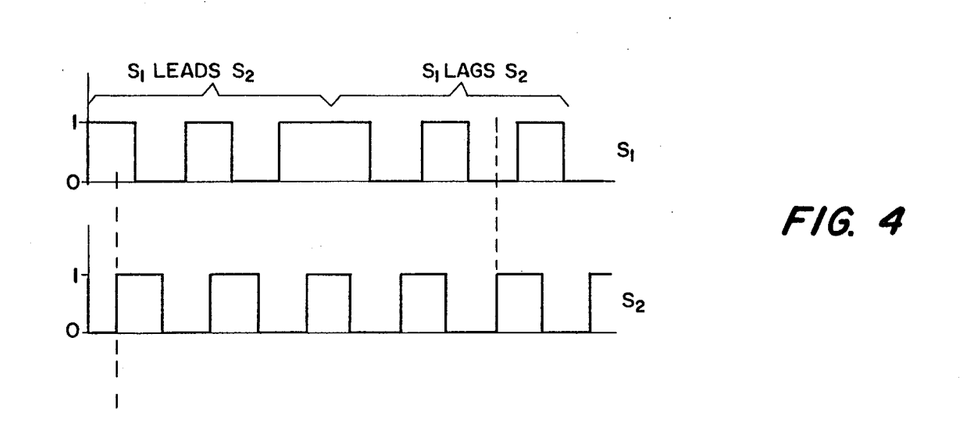
FIG. 4 is a plot of a signal waveform useful in describing the invention.

The feedback circuit 58 develops the feedback signal 60 from the phase quadrature signals. FIG. 4 shows the phase quadrature signals for both directions of travel of the scanning mirror 10. Rotation of the scanning mirror 10 in one direction produces signals $S_1$ and $S_2$ wherein at the $S_2$ transition from the zero level to the one level, $S_1$ has a value of one, i.e., $S_1$ leads $S_2$ by 90 degrees. Upon rotation of the mirror 10 in the opposite direction, the zero to one transition of $S_2$ occurs while $S_1$ is in the zero state, i.e., $S_1$ lags $S_2$ by 90 degrees. A direction discrimination logic circuit 80 (FIG. 3) uses this information to determine the direction of scanning mirror 10 rotation and to produce an output signal indicative of mirror displacement and direction. Arbitrarily assigning the two directions as clockwise ($S_1$ leads $S_2$) and counterclockwise ($S_1$ lags $S_2$), a cw/cw position counter 82 produces output digital signals indicative of absolute mirror 10 position. A digital to analog converter 84 produces the feedback signal 60 which is compared to a reference signal 62 in a signal combiner 88. An error amplifier 90 adjusts the signal level relative to a reference level. The corresponding output signal, error signal 64, passes through the compensation network 52 which includes a loop filter 92 and a driver amplifier 94, but which can take any of the forms known in the art. The compensated error signal drives the scanning mirror 10.

Figure 2:
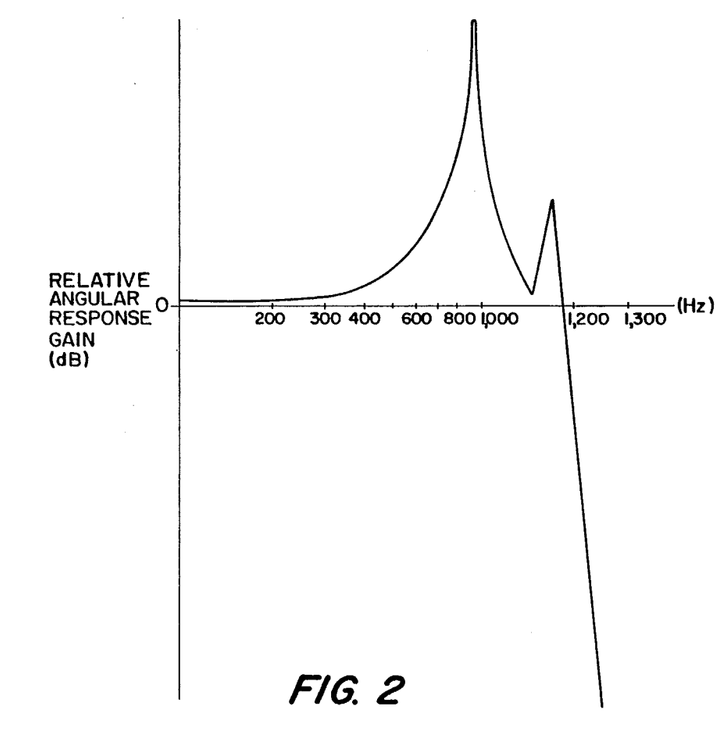
FIG. 2 is a qualitative plot of the angular response gain vs. frequency curve of the scanning element of FIG. 1 when excited with constant input voltage.
Figure 5:
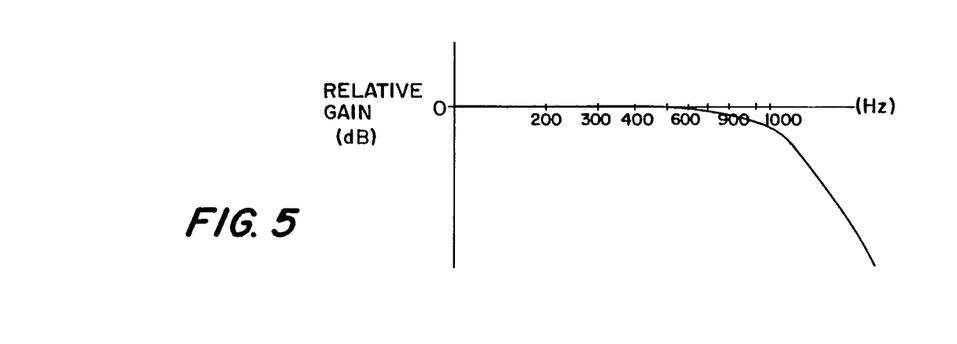
FIG. 5 is a qualitative plot of the gain vs. frequency response of the servo control loop of FIG. 3.

The gain vs. frequency response curve for the servo of FIG. 3 is qualitatively shown in FIG. 5, the flatness of such response curve resulting from the workings of the compensation network 52. Since no mechanical structures are employed for purposes of producing feedback signals, the scanning parts of the FIG. 3 servo has virtually undamped motion and, attendantly, the FIG. 3 servo has a bandwidth nearly as great as depicted in FIG. 2.

Figure 6:
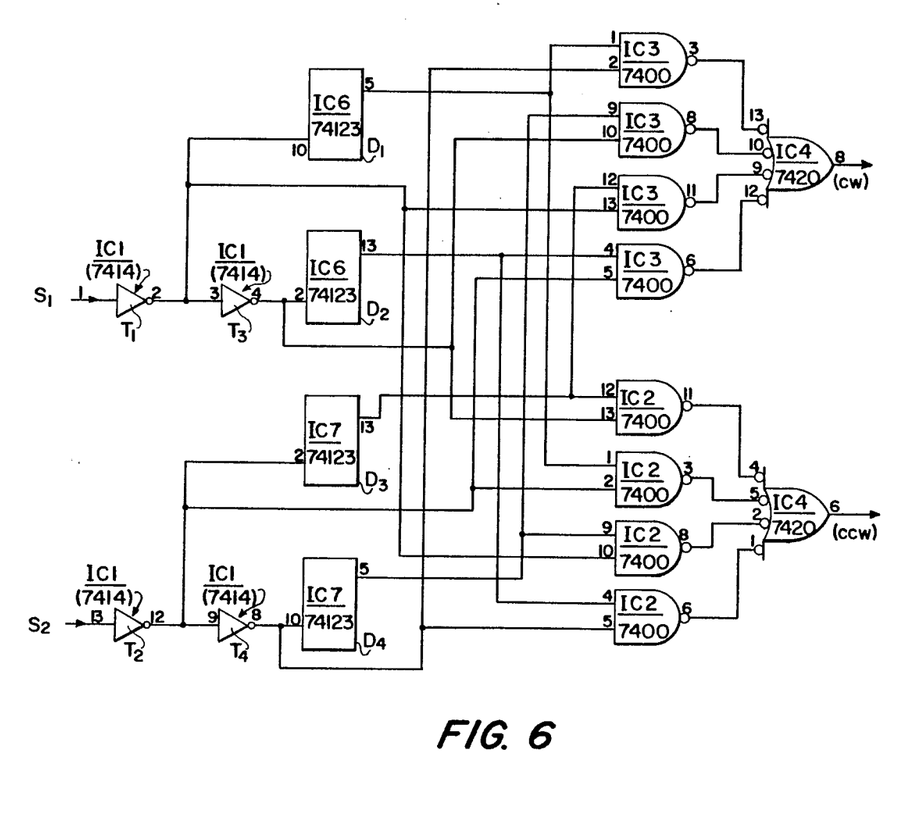
Figure 7A:
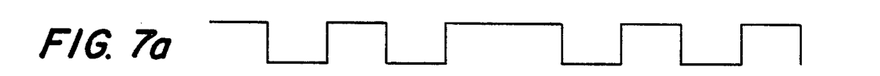
Figure 7B:
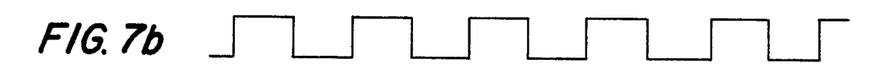
Figure 7C:
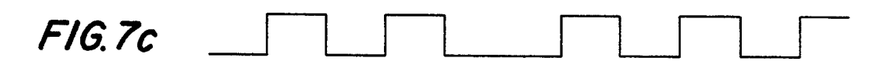
Figure 7D:
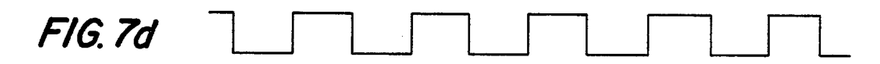
Figure 7E:
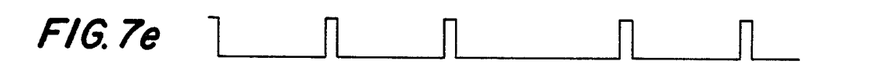
Figure 7F:
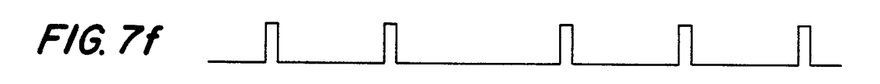
Figure 7G:
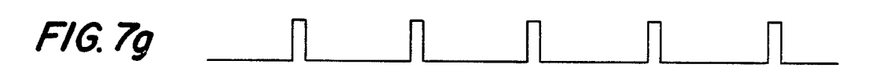
Figure 7H:
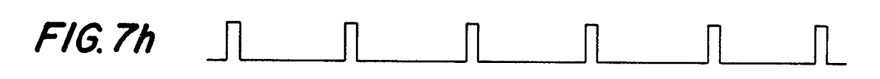
Figure 7I:
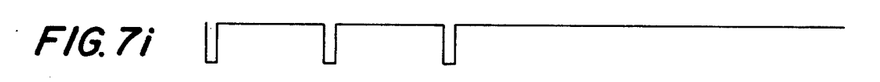
Figure 7J:
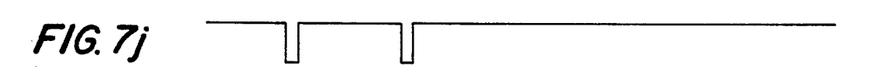
Figure 7K:
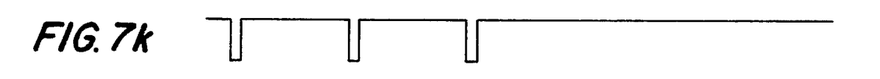
Figure 7L:
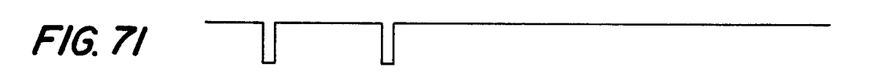
Figure 7M:
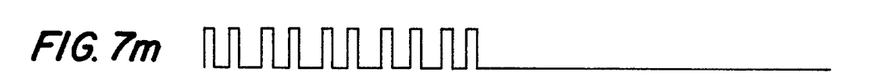
Figure 7N:
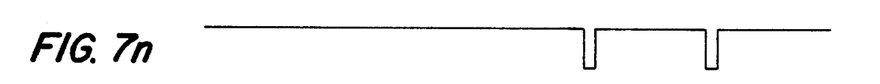
Figure 7O:
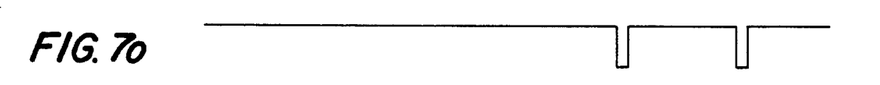
Figure 7P:
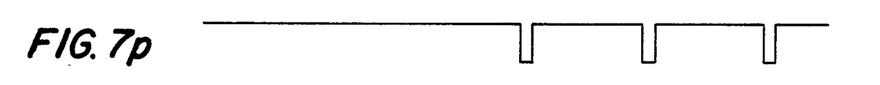
Figure 7Q:
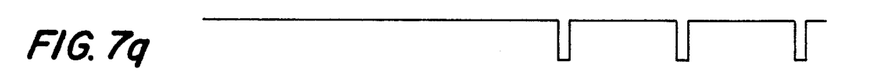
Figure 7R:
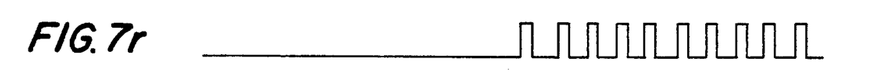
Figure 8:
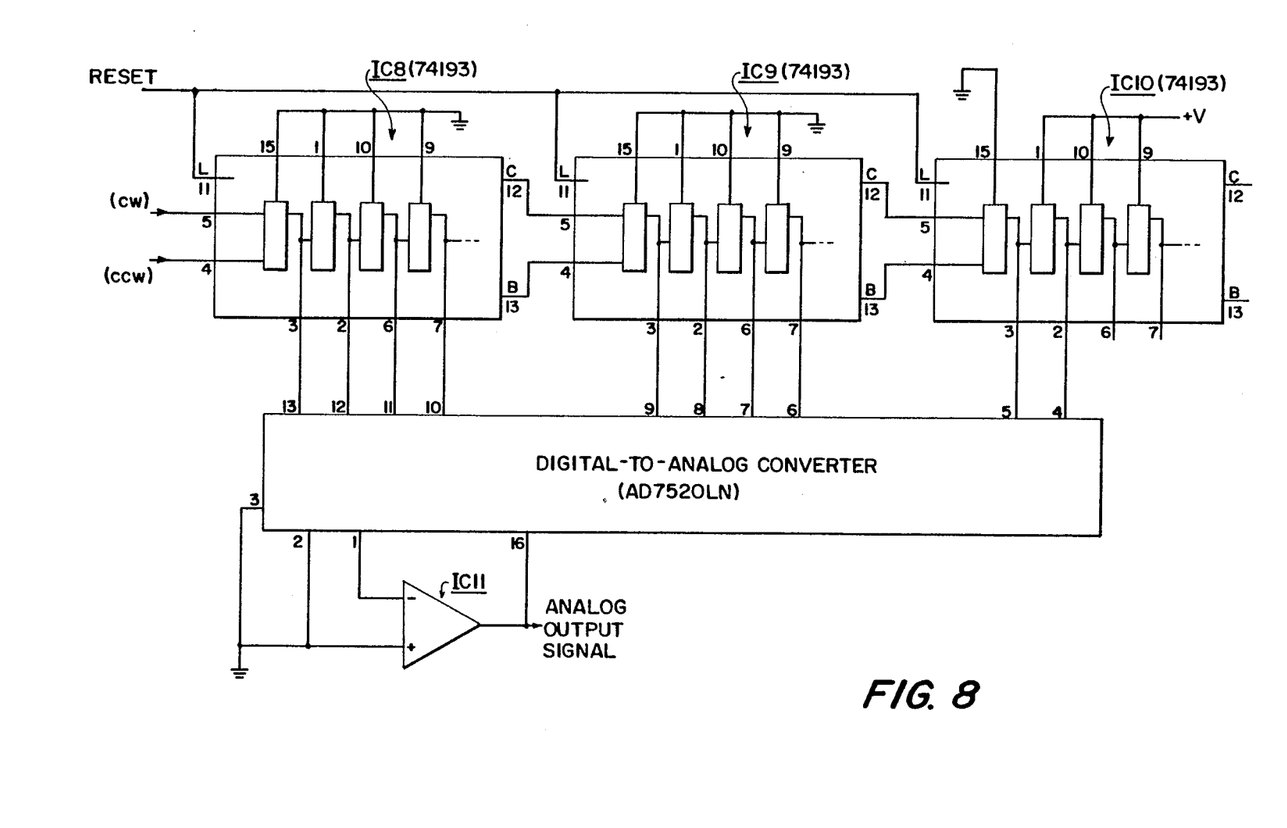

FIGS. 6 and 8 show the feedback circuit 58 in more detail. FIG. 6 shows a circuit that can be used as the direction discriminator 80; FIG. 8 shows a circuit combining the functions of the cw/ccw position counter 82 and the digital to analog converter 84. An understanding of the operation of the circuit shown in FIG. 6 is facilitated by reference to FIG. 7, which shows waveforms of signals at various circuit points.

Referring to FIG. 6, IC1 is an integrated circuit type 7414 containing six Schmitt trigger inverters of which the four being used are designated $T_1$ through $T_4$. The signals $S_1$ and $S_2$ (FIG. 4) are applied to input pins 1 and 13 respectively of the trigger inverters $T_1$ and $T_2$. The signal waveforms at output pins 2 and 12 are shown in FIGS. 7a and 7b respectively. The second pair of trigger inverters $T_3$ and $T_4$ produce the output signals shown in FIGS. 7c and 7d at output pins 4 and 8 respectively. It is seen from FIGS. 7a through 7d that the purpose of the trigger inverters, apart from squaring the edges of the signals $S_1$ and $S_2$, is to produce, by inverting $S_1$ and $S_2$, four signal waveforms shifted in phase by 90 degrees.

IC6 and IC7 are identical integrated circuits, type 74123, each containing a pair of "one shot" multivibrators $D_1$ through $D_4$. These one shot multivibrators are connected to produce single, short duration pulses (about 5 μs duration) at their output terminals in response to the positive going or leading edge of an input pulse. The signal waveforms at the output pins 5, 13 of IC6 and 5, 13 of IC7 are thus as shown in FIGS. 7e-7h respectively. These signal waveforms are applied to certain inputs of IC2 and IC3, both type 7400 NAND gates. The remaining inputs to IC2 and IC3 are connected directly to the outputs of the trigger inverters $T_1$ through $T_4$, as shown in FIG. 6.

Considering the NAND gate between pins 1, 2 and 3 of IC3 in detail (the operation of the remainder of the NAND gates is similar and need not be described in detail), the input signals applied to pins 1 and 2 are shown in FIGS. 7e and 7d respectively. Accordingly, the output signal at pin 3 is as shown in FIG. 7i. In a similar manner, the output signals at pins 8, 11 and 6 of IC3 are shown in FIGS. 7j, 7k and 7l respective. The output signals at pins 11, 3, 8 and 6 of IC2 are shown in FIGS. 7n, 7o, 7p and 7q respectively. The inputs to IC4, a 7420 type OR gate with inverting inputs, are thus defined and the output signal waveforms at pins 8 and 6 of IC4 are shown in FIGS. 7m and 7r respectively.

It is now apparent from inspection of FIGS. 4, 7m and 7n that when the signal $S_1$ leads $S_2$ by 90 degrees, the output signal at pin 8 of IC4 is a pulse train (FIG. 7m), while the output at pin 6 of IC4 is flat (FIG. 7r). These output states, taken together, correspond to a clockwise movement of the scanning mirror. When the scanning mirror changes direction, the signal $S_1$ lags $S_2$ by 90 degrees and the output signal at pin 8 of IC4 goes flat (FIG. 7m), while the output signal at pin 6 of IC4 becomes a pulse train (FIG. 7r). A pulse train at pin 8 of IC4 therefore represents clockwise movement of the scanning mirror, and a pulse train at pin 6 of IC4 represents counterclockwise movement. (It will be apparent to those of ordinary skill in the art that the output states at pins 8 and 6 of IC4 are representative of two directions of mirror movement, and that such directions do not necessarily have to be clockwise and counterclockwise. It makes no difference, for example, if the mirror moves left and right, up and down, frontwards and backwards, etc.).

Referring now to FIG. 8, the cw and ccw output signals are applied to input pins 5 and 4 of a counter. The counter is comprised of three 74123 4-bit binary counters (labeled IC8, IC9 and IC10) connected in cascade Pins 6 and 7 of IC10 are unused so the counter has a 10 digit capacity. Initially, the counter is reset and all digits go low (logic 0 state) except for the most significant digit being preset through pin 1 of IC10, which goes high (logic 1 state). The counter is thus initialized at mid-scale, and is ready to count up or down (corresponding to a clockwise or a counterclockwise movement of the scanning mirror respectively) without going off scale.

The counter output is applied to a type AD7520LN digital to analog counter which produces an analog output signal, after amplification by a differential amplifier IC11, proportional to the count. It is this analog output signal which is applied to signal combiner 88 for comparison with the reference signal 62.

If the signals $S_1$ and $S_2$ were not square waves (as would be the case if the optical element 76 had a sinusoidally varying density profile, or other non-sharp transition profile), the same circuits shown in FIGS. 6 and 8 could be used if the signals $S_1$ and $S_2$ were squared off, for example by a threshholding technique, before input to pins 1 and 13 of IC1.

In an alternate embodiment of the invention, a cylindrical lens is used in place of the lenticular film 68 of FIG. 3 to produce an elongate elliptical pattern of radiation on the scanning mirror 10 instead of two spots of radiation. The optical element 76 is positioned between the mirror 10 and lens 70 to phase quadrature modulate the radiation incident upon the detectors 72, 74. Because the two spot radiation pattern has been replaced with an elongated elliptical radiation pattern, wobble of the radiation pattern (discussed above) at the plane of the detectors 72, 74 is not as great a problem. This is because the elliptical radiation pattern is large in its long axis direction relative to the sensing areas of the detectors 72, 74 and, therefore, the detectors remain illuminated even in the presence of substantial amounts of radiation pattern wobble. It should be noted that the system is insensitive to amplitude variations due to a non-uniform radiation pattern (i.e., drop-off in intensity towards the edges of the elliptical radiation pattern) because the mirror position information is digital in nature.

The invention has been described in detail with particular reference to preferred embodiments thereof, but it will be understood that variations and modifications can be effected within the spirit and scope of the invention. What is claimed is:

1. In a servo control loop for controlling a scanning mirror that is rotatable about an axis, the improvement comprising:
    means for forming a pair of radiation spots on the scanning mirror;
    a pair of radiation detectors;
    an optical lens for focussing said radiation spots onto respective radiation detectors of said pair of radiation detectors, said optical lens being disposed in the optical path between said scanning mirror and said detectors such that the location of the axis of rotation of said scanning mirror and the locations of said detectors are generally at conjugate distances of said optical lens; and
    an optical element comprised, in alternation, of regions of relatively different transmissive optical characteristics, said optical element being disposed in the optical path between said scanning mirror and said radiation detectors so as to modulate in phase quadrature the intensity of radiation received by said detectors,
    whereby the output signals from said radiation detectors define feedback signal information for the servo control loop.

2. Apparatus for use in detecting the position of a scanning mirror that is rotatable about an axis, said apparatus comprising:
    means for forming a radiation pattern incident upon said scanning mirror;
    a pair of radiation detectors;
    an optical lens for focussing said radiation pattern onto said pair of radiation detectors, said optical lens being disposed in the optical path between said scanning mirror and said detectors such that the axis of rotation of said scanning mirror and the locations of said detectors are generally at conjugate distances of said optical lens; and
    an optical element comprised, in alternation, of regions of relatively different opacity, said optical element being disposed in the optical path between said scanning mirror and said radiation detectors to modulate in phase quadrature the intensity of radiation received by said detectors,
    whereby the output signals from said radiation detectors provide information as to the position of the scanning mirror.

3. In a servo control loop for controlling the rotational position of a scanning mirror that is rotatable about an axis comprising:
    feedback means for providing a feedback signal indicative of the actual position of the scanning mirror;
    means for producing a reference signal; and
    an error detector for producing an error signal indicative of the relative state of the reference signal and said feedback signal, said error signal providing position control of the scanning mirror,
    the improvement wherein said feedback means includes:
    means for producing and reflecting a pair of collimated beams of radiation from the scanning mirror;
    an optical lens for focussing said reflected beams onto respective radiation detectors, said optical lens being disposed in the optical path between said scanning mirror and said detectors such that the axis of rotation of said scanning mirror and the locations of said detectors are generally at conjugate distances of said optical lens; and
    an optical element comprised, in alternation, of relatively transparent and opaque regions, said optical element being disposed in the optical path between said scanning mirror and said radiation detectors to modulate in phase quadrature the intensity of radiation received by said detectors.

4. In a servo control loop for controlling a scanning mirror that is rotatable about an axis, the improvement comprising:
    means for forming an elongate, elliptically shaped radiation pattern on the scanning mirror;
    a pair of radiation detectors;
    an optical lens for focussing said radiation pattern onto said pair of radiation detectors, said optical lens being disposed in the optical path between said scanning mirror and said detectors such that the axis of rotation of said scanning mirror and the positions of said detectors are generally at conjugate distances of said optical lens; and
    an optical element comprised, in alternation, of relatively transparent and opaque regions, said optical element being disposed in the optical path between said scanning mirror and said radiation detectors to modulate in phase quadrature the intensity of radiation received by said detectors,
    whereby the output signals from said radiation detectors provide a feedback signal for the servo control loop.

* * * * *